Figure 3:
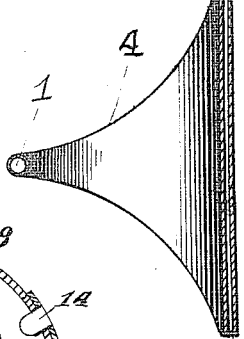

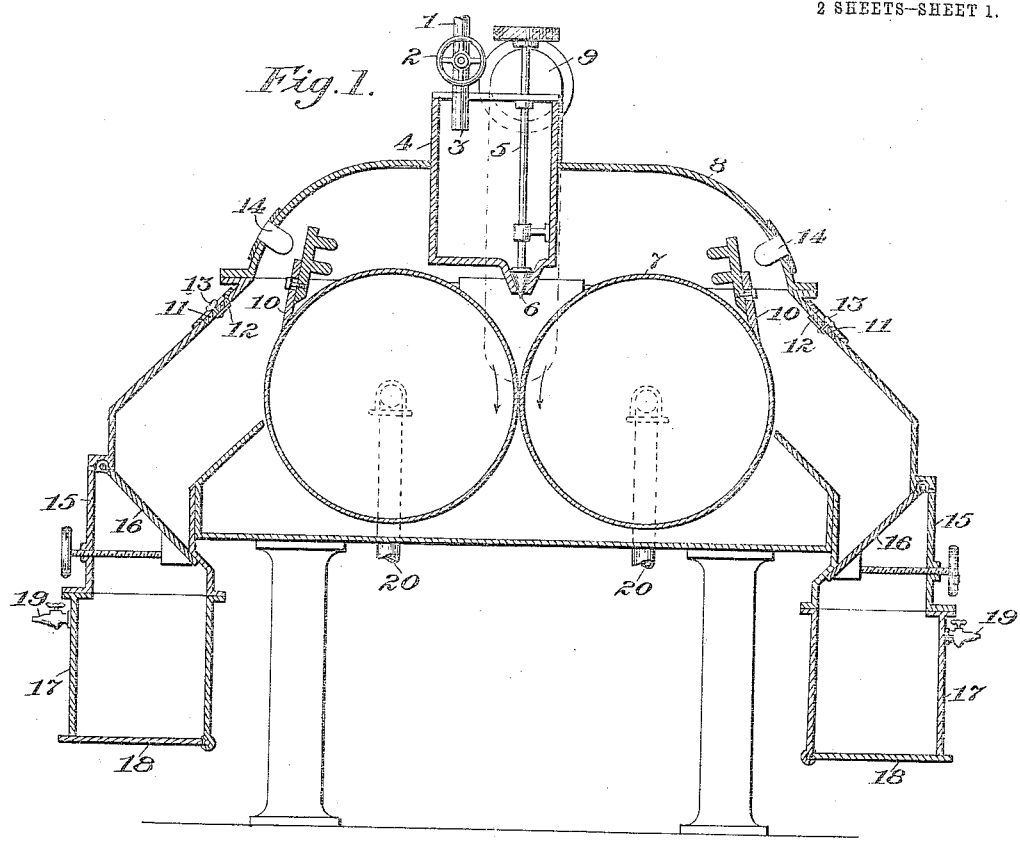

W. H. SWENARTON.
PROCESS OF DESICCATING THE SOLID CONTENT OF MILK.
APPLICATION FILED JAN. 13, 1906.

995,303.

Patented June 13, 1911.

2 SHEETS—SHEET 2.

WITNESSES:
N. Prichep
C. E. Worz

INVENTOR
Waitstill H. Swenarton
BY
Byrnes, Townsend & Swenarton
his ATTORNEYS

UNITED STATES PATENT OFFICE.

WAITSTILL H. SWENARTON, OF MONTCLAIR, NEW JERSEY.

PROCESS OF DESICCATING THE SOLID CONTENT OF MILK.

995,303.  Specification of Letters Patent.  Patented June 13, 1911.

Application filed January 13, 1906. Serial No. 295,886.

*To all whom it may concern:*

Be it known that I, WAITSTILL H. SWENARTON, a citizen of the United States, residing at Montclair, in the county of Essex and State of New Jersey, have invented certain new and useful Improvements in Processes of Desiccating the Solid Content of Milk, of which the following is a specification.

My invention relates to the desiccation of milk and has for its object the separation of the milk-solids in the form of a fluffy, flaky powder, which upon the addition of warm water thereto will readily dissolve and emulsify to form a liquid having all the properties of normal milk. These objects I attain by delivering a mass of homogeneously-concentrated milk, free from unconcentrated portions in the form of a thin layer or sheet, to moving heated surfaces initially heated in excess of five (5) degrees centigrade above the boiling point of the milk at the pressures at which the operation is performed. The layer is cooled during the formation of the same by the inflowing milk in its passage to the receiving receptacle, but without direct contact therewith and is removed in the form of a self-sustaining mass having the identity of a film from the heating surface prior to the complete evaporation of the water therefrom and while still possessing a slightly moist appearance.

Milk has long been considered a typical emulsion, and naturally the casein, which is the principal proteid constituent, exists in the form of what has been termed a di-calcium caseinate which, owing to its affinity for water, is in a highly swollen state. If the so-called poise of the calcium caseinate molecule is affected, either by protracted heating at those temperatures at which the calcium salts precipitate, or by excessive drying, the calcium caseinate loses to a greater or less extent this affinity for water and therefore the formation of a perfect emulsion upon the addition of warm water to the dry product, no longer results. Besides casein, milk and especially skim-milk, contains, in almost equal amounts, lactose or milk-sugar. This milk-sugar normally crystallizes with one molecule of water

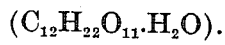

$(C_{12}H_{22}O_{11}.H_2O)$.

Although this water is not yielded up after crystallization has taken place until the temperature reaches about 140 C., nevertheless prior to such crystallization, the water present in which the milk-sugar is dissolved, may be entirely evaporated at temperatures much below 140 C., and these temperatures approximate the boiling point of water at the pressure at which the process is performed. Then again milk-sugar caramelizes when heated in the air to high temperatures and in a concentrated condition. At high temperatures also the air has an energetic action upon the same and renders it very difficultly soluble. The well known skin which forms when milk is heated in the air for protracted periods even at the boiling point illustrates the above noted changes in the casein and milk sugar due to protracted heating in the air. The proper treatment of the two ingredients above noted, therefore, is the crux of all drying processes.

Heretofore in desiccating milk *in vacuo*, to which method of drying my process particularly relates, the temperatures used have been such that the heating surface or roll was maintained at and even in rare instances above the boiling point of the liquid in the *vacuo* maintained, but in each instance, either the temperature of the medium used to heat the surface or roll, which temperature is approximately indicated by the initial temperature of the roll, was less than five (5) degrees centigrade above the boiling point of the particular *vacuo* maintained, or again in cases where the temperature was sufficiently high, the method of delivering the milk to the heating surface was such that an unequal and non-homogeneous layer was deposited upon said rolls. In the former process, owing to the considerable cooling effect of the large body of inflowing unconcentrated liquid in the retaining pocket or receptacle, the temperature of the heating surface falls to such an extent that the immediate vaporization of the water in the layer (as distinguished from immediate boiling), fails to occur and hence in lieu of heating the film while revolving the heating-rolls in ten second periods, as is the case in my process as hereinafter described, in many cases but one revolution in forty-five seconds occurs, with the results due to prolonged heating heretofore noted. In the latter process, since a thin layer of unconcentrated liquid naturally required less time to dry than a thick layer of concentrated liquid, the process was impracticable because exact regulation of the drying period in order to obtain a uniform product was obviously impossible. In neither of the above cases moreover was any allowance made for the five per cent. of water which the molecule of milk sugar is capable of chemically uniting with, but the milk was reduced to complete or "bone" dryness as is borne out by the reference in the cases to subsequent grinding in a pebble mill or otherwise in order to produce an impalpable powder which could thus offer the largest possible surface to any liquid added thereto. These products, however, notwithstanding their impalpable condition, were granular and failed to emulsify in a satisfactory manner upon the addition of warm water thereto, and in no instance was the temperature of the heating surface sufficiently high to produce a sterile milk powder, i. e. above 75° C., as although many disease producing bacteria are destroyed when temperatures of from 65° C. to 70° C. are maintained for periods extending over several minutes, a momentary heating period requires a higher temperature for the destruction of the bacteria and in both cases a temperature in excess of 75° C. is required to destroy the spores which in certain instances even multiply at 70° C. Owing to the violent agitation and thorough heating of every particle of the milk, even momentary heating above 75° C. serves in my process to destroy substantially all deleterious bacteria.

Having thus indicated the nature and object of my process, and in order to enable those skilled in the art to practice the same, I will now proceed to describe my preferred mode of performing it, reference being had to the apparatus disclosed in the accompanying drawings, forming a part of this specification.

Like reference numerals are used to designate like parts throughout and in both the specification and claims I include under the term milk various lacteal liquids having similar properties, such as normal milk, skim-milk, modified milk, etc. Owing to the analogous properties possessed by solutions of casein, a derivative of milk, I consider the treatment of the same according to the herein described process, to be equally within the spirit of my invention.

Figure 2:
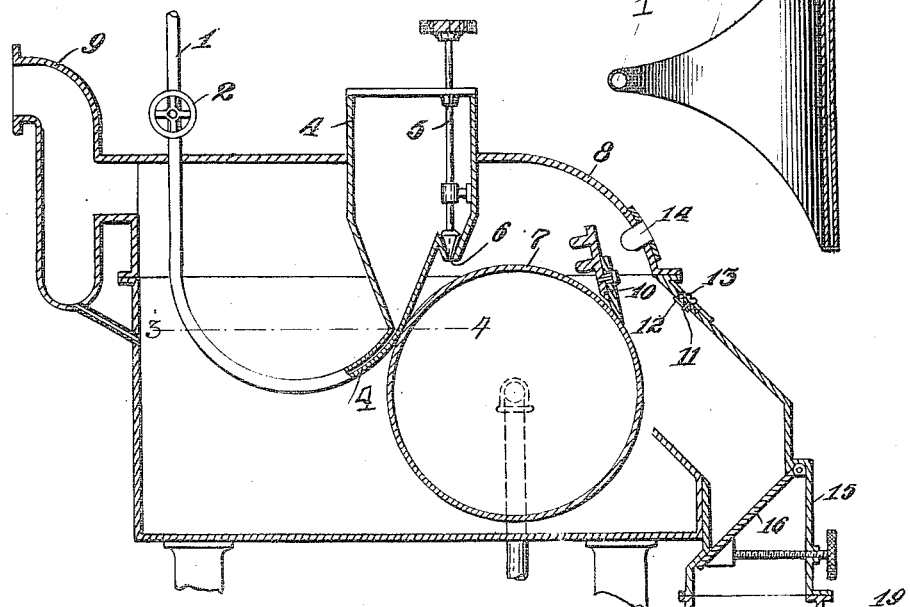

In the accompanying drawings: Figure 1 is a longitudinal elevation chiefly in section. Fig. 2 is a longitudinal elevation chiefly in section of a single cylinder evaporator, showing the method of delivering the milk and simultaneously cooling the forming film. Fig. 3 is a plan view of the distributer, isolated, and Fig. 4 is a similar view of a modification, both views being along lines corresponding to line 3—4 of Fig. 2.

Referring to the drawings, the numeral 1 designates the supply pipe which is in communication with a reservoir (not shown). The pipe is provided with a valve 2 and a nozzle 3, which afford communication with a distributer 4. Adjustable conical valves 6 on stems 5 serve to accurately regulate the supply of liquid to the cylinders 7. A vacuum-pan casing 8 envelops the cylinders and the vapors are drawn off therefrom through an outlet 9 to a condenser (not shown). Adjustable doctors or knives 10 are connected with the casing and suitable observation windows 11 are provided. A rotatable wiper 12 operated by a button 13, serves to remove deposited mist from said windows. Within the apparatus is arranged a lamp 14 which permits of observation of the film during evaporation of the same. The casing is provided on opposite sides with chutes 15 which terminate in air locks 17, comprising the valves 16, the bottoms 18 and the exhaust cocks 19. A pipe 20 serves to supply suitable heating mediums to the cylinders, such for example as exhaust water from a condenser mingled with the amount of steam necessary to produce the desired temperature, or exhaust steam from a condenser may be advantageously utilized in lieu of said mixture of "live" steam and hot water. If desired a partial *vacuo* can be established in the interior of said cylinders, when using hot water, in order to convert the same into low pressure steam and secure increased thermal efficiency. Moreover various constructions may be adopted for said cylinders in order to efficiently heat the same, such for example as those disclosed in the patents to Passburg #830,521 of September 11, 1906 (filed July 27, 1905), and to Ekenberg, #764,995 of July 12, 1904, all without departing from the spirit of my invention.

In Fig. 2 the numeral 1 represents the supply pipe which is in communication with a reservoir (not shown) and may be arranged to permit of gravity feed of the milk in lieu of the customary forced feed, if desired. A distributer 4 is extended at the bottom in the form of an arc which may if desired possess a radius equal to that of the abutting cylinder and is preferably of nickel steel. A supply pipe 1 is connected with the arc-like extension distant from the cylinder and adjustable conical valves 6, on stems 5, serve to regulate the supply of milk to the retaining pocket formed between the distributer and the abutting cylinder 7. A doctor 10 serves to remove the tenacious film from the cylinder when the same is revolving in the direction indicated by the arrow.

Figure 4:
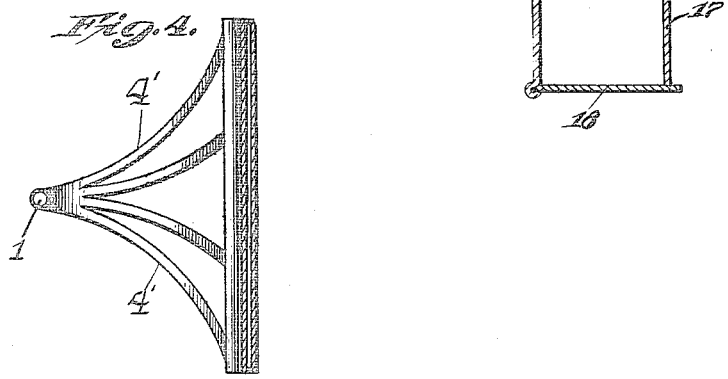

In Fig. 4 the numerals 4' designate the extended portions of the bottom of the distributer which serve to feed liquid from the pipe 1 to the abbreviated arc-like extension of the bottom of the distributer 4.

The operation of my process as preferably carried out, is as follows: The milk is delivered from the distributer to the retaining pocket formed by the abutting cylinders, as disclosed in Fig. 1 or by the abutting distributer and cylinder of Fig. 2. The temperature of the cylinder in my preferred process, corresponds to the ratio $$\frac{82.5}{100}$$

i. e. the boiling point of the vacuum maintained is 82.5% of the temperature of the heating medium of said cylinder, although it is obvious, since the milk must be dried during a portion of a revolution, that if the layer were of excessive thickness, the substantial reduction of said layer to a self-sustaining film will not occur within a single revolution unless the difference between the boiling point of the *vacuo* and the temperature of the heating surface in such cases is somewhat greater than $$\frac{82.5}{100}.$$

This can of course be readily determined by trial when the necessity therefor arises.

The boiling points of milk in any particular *vacuo* can be readily determined either by actual measurement or more expeditiously, by reference to physico-chemical tables, relating to the boiling points of water at different sub-atmospheric pressures, since their boiling points for all practical purposes are substantially identical. The following approximate data, have been taken from such a table:

| Vacuum. | Boiling point of milk. |
|---|---|
| 12.7 cm | 90.5 degrees C. |
| 25.4 cm | 85.0 " |
| 38.1 cm | 75.0 " |
| 50.8 cm | 65.5 " |
| 63.5 cm | 54.5 " |
| 66.0 cm | 49.0 " |
| 68.6 cm | 45.0 " |

In order to produce a sterile milk powder, the milk is delivered onto cylinders, heated for example to 98° C. and a *vacuo* corresponding to a boiling point of 82.5% of 98 or 81° C. is maintained. If a temperature, sufficient to destroy the developed bacteria and not the spores is used, as for example 75° C., then a *vacuo* of 54.5 cm. is preferably maintained. If it be desired to produce a so-called milk-powder capable of reproducing a solution in which lactic acid fermentation progresses on standing, in a manner similar to that in the case of normal milk, and which solution will be readily peptonized by rennet, I preferably heat the cylinder to 54.5° C. while maintaining a *vacuo* corresponding to 45° C. or as given in the above table 68.6 cm.

In order to eliminate the well known skin formed by the action of air at high temperatures upon the casein, milk-sugar and various salts normally found in milk, and which skin causes the occlusion of the steam with a consequential protracted heating of the milk solids, whether evaporating under low *vacuo* or in the open air, I have discovered an economical and effective method whereby the layer while forming, is maintained below the temperature at which the said deleterious action occurs, or as it may be termed, the critical temperature, and the heat so abstracted is conserved and utilized to heat the inflowing milk in its passage to the retaining pocket. This cooling effect, I accomplish as illustrated in Fig. 2, by causing the milk in its passage from the reservoir to the distributer, to expand into a thin layer or sheet, and to contact with the opposite surface of the nipping or film-forming wall from that in contact with the concentrated milk in the retaining pocket and adjacent the area where the formation of said film occurs. The bottom of the distributer, as shown, is extended in the form of an arc, and preferably has an internal dimension, transversely of the cylinder and at a point adjacent thereto, of from 1.5 to 2.5 cm., whereby a continuous sheet of milk of the above depth may be caused to cool the forming layer. The bottom of said distributer may be either extended along the entire length, or it may be extended at intervals along the same without departing from the spirit of my invention which includes any method of transference of the heat from the layer while forming to inflowing milk in its passage to the retaining pocket. Since the inner surface of the distributer merges into that of the extension in a continuous curve it is perfectly smooth with the result that circulation of milk along the same is entirely unimpeded. In practice my distributer is provided with extremely thin walls in order to effect the greatest amount of cooling of the layer and suitable adjusting means may if desired be provided, whereby the distance of the distributer from the cylinder may be accurately regulated.

Whichever one of the above methods of feeding the milk is selected is immaterial in so far as the next stage of the process is concerned, as the water in the milk, upon contact with the highly heated cylinders (highly heated with respect to the *vacuo*) is immediately vaporized and unless the milk in the form of a self-sustaining mass having the identity of a film is almost instantly removed therefrom while still slightly moist and tenacious, the water of crystallization, which serves as a margin of safety, so to speak, is evaporated with the resultant destruction of the desired properties heretofore noted. In practice the film is removed while still possessing a slightly moist appearance and while retaining sufficient water to possess when cool a moisture content in excess of 1% and in the case of milk consisting of ⅔ whole milk and ⅓ skim-milk the powder should contain from 2% to 4% of moisture. On cooling a film containing the minimum amount of moisture stated, the chemical and physical absorption of water occurs with the production of a perfectly dry powder, which owing to the entire absence of caking while evaporating, readily disintegrates and may be sifted to a light, fluffy, flaky powder approximating $\tfrac{5}{10}$ S. G. without resorting to grinding as is customary in other *vacuo* processes. Moreover, owing to the presence in said product of the casein, milk-sugar, lact-albumin and other non-fatty ingredients thereof, in their natural and unaltered condition, the said product can be readily emulsified with cold water and a liquid is obtained which has a natural milk-like odor and appearance and is substantially free from any "burnt" or "boiled" flavor due to the presence of caramelized milk-sugar, altered casein, or altered lact-albumin. Naturally a certain amount of the moisture in the moist film, in addition to that which is absorbed, will be driven off by the normal evaporation during the passage of the film into the receptacle or chamber arranged to receive the same. Moreover, since said chamber is heated by the radiation and conduction of heat from the evaporating chamber as herein provided for, (or, if desired, by supplemental heating means of any desired type) additional moisture will continue to evaporate from the film after entering said receptacle, until nothing but the fluffy powder remains. A speed of six revolutions per minute as against one revolution in 45 seconds, customary in another well known *vacuo* process, can be maintained in my process and in practice the size of the rolls is such that this speed is equivalent to a peripheral speed of 14 meters per minute.

As I am not the first inventor thereof, I disclaim the invention covered by the following counts:

1. The process of desiccating milk which consists in rapidly partially condensing the same under diminished atmospheric pressure at a temperature below 212° F., withdrawing portions of the partially condensed material from below the surface thereof and subjecting it in thin masses to heat at a temperature below 212° F., under diminished atmospheric pressure.

2. The process of desiccating milk which consists in rapidly partially condensing the same by boiling it violently by exposure, under diminished atmospheric pressure, to moving heated surfaces, withdrawing the partially condensed material from the bottom of the mass in thin layers or films of uniform thickness upon the said heated surfaces, under diminished atmospheric pressure.

3. The process of desiccating milk which consists in rapidly partially condensing the same by bringing it in small quantities under diminished atmospheric pressure into contact with heated surfaces maintained at a temperature below 212° F. but sufficiently high to produce almost immediate violent ebullition of the whole volume of the milk, withdrawing the partially condensed material from the bottom of the mass in the form of thin layers or films upon moving rollers and subjecting the same to heat at a temperature below 212° F., under diminished atmospheric pressure.

It is not desired to claim in this application any process not carried out in a *vacuo*, or any product not produced by a *vacuo* process, and applicant specifically disclaims any and all products not produced *in vacuo*, but by processes carried out under normal or super-normal atmospheric pressures.

It is evident that when the layer of milk is cooled, while forming by inflowing milk, as herein described, it will froth considerably under the reduced pressure in the auxiliary receptacle prior to its escape through the outlet thereof, and prior to its coming in direct contact with the excessively heated evaporating roll, and that accordingly the frothing will be less than were the milk subjected, in the form of a thin layer, to an excessive temperature with respect to the boiling point of the *vacuo*, immediately upon it being subjected to the reduced atmosphere pressure.

The word "film" as employed in the claims is used to designate the self-sustaining mass which results from the evaporization of the greater portion of the liquid from the milk as the same is removed from the evaporating surface, this term being used to distinguish it from an amorphous slime from which it is as difficult to entirely remove the remaining liquid as it would be from an original milk solution.

Having thus described my invention, what I claim is:

1. In the process of desiccating the solid-content of milk, the steps which consist in delivering a mass of milk onto a surface *in vacuo* heated in excess of five degrees centigrade above the boiling point of the milk in said *vacuo*, heating said mass for a period of ten seconds or less, and then removing said milk in the form of a self-sustaining mass having the identity of a film from said surface in such a condition that it has a moist appearance and its moisture-content when dry and cool is in excess of one and one-half per cent.

2. In the process of desiccating the solid-content of milk, the steps which consist in delivering a mass of milk onto an evaporating surface *in vacuo* heated in excess of five degrees centigrade above the boiling point of the *vacuo*, and then removing said milk in the form of a self-sustaining mass having the identity of a film from said surface while in such a condition that it has a moist appearance, and its moisture-content when dry and cool is in excess of one and one-half per cent.

3. In the process of desiccating the solid-content of milk, the steps which consist in delivering a mass of milk onto an evaporating surface *in vacuo* heated in excess of five degrees centigrade above the boiling point of the *vacuo*, and then removing said milk in the form of a self-sustaining mass having the identity of a film from said surface while in such a condition that it has a moist appearance and its moisture-content when dry and cool is between two and one-half and four per cent.

4. In the process of desiccating the solid-content of milk, the steps which consist in delivering a mass of milk onto an evaporating surface *in vacuo* heated in excess of five degrees centigrade above the boiling point of the *vacuo*, and then removing the said milk in the form of a self-sustaining mass having the identity of a film from said surface while in such a condition that it has a moist appearance and its moisture content when dry and cool is between one and one-half and five and one-half per cent.

5. In the process of desiccating the solid-content of milk, the steps which consist in delivering a mass of milk onto an evaporating surface *in vacuo* heated in excess of five degrees centigrade above the boiling point of the *vacuo* and in excess of seventy-five degrees centigrade, and then removing the said milk in the form of a self-sustaining mass having the identity of a film from said surface while in such a condition that it has a moist appearance and its moisture-content when dry and cool is between one and one-half and five and one-half per cent.

6. In the process of desiccating the solid-content of milk, the steps which consist in delivering a mass of milk onto an evaporating surface *in vacuo* heated in excess of five degrees centigrade above the boiling point of the *vacuo*, and in excess of ninety degrees centigrade, and then removing said milk in the form of a self-sustaining mass having the identity of a film from said surface while in such a condition that it has a moist appearance and its moisture-content when dry and cool is between one and one-half and five and one-half per cent.

7. In the process of desiccating the solid-content of milk, the steps which consist in delivering a mass of milk onto an evaporating surface *in vacuo* heated in excess of five degrees centigrade above the boiling point of the *vacuo* and in excess of ninety-five degrees centigrade and then removing the said milk in the form of a self-sustaining mass having the identity of a film from said surface while in such a condition that it has a moist appearance and its moisture-content when dry and cool is between two and one-half and five and one-half per cent.

8. In the process of desiccating the solid-content of milk, the steps which consist in delivering a mass of milk onto an evaporating surface *in vacuo* heated in excess of five degrees centigrade above the boiling point of the *vacuo* and to a temperature approximating ninety-eight degrees centigrade, and then removing the said milk in the form of a self-sustaining mass having the identity of a film from said surface while in such a condition that it has a moist appearance and its moisture-content when dry and cool is between one and one-half and five and one-half per cent.

9. In the process of desiccating the solid-content of milk, the steps which consist in delivering a mass of milk onto an evaporating surface *in vacuo* heated in excess of five degrees centigrade above the boiling point of the *vacuo* and in excess of seventy-five degrees centigrade, and sufficiently high to sterilize said milk, and then removing the said milk in the form of a self-sustaining mass having the identity of a film from said surface while in such a condition that it has a moist appearance and its moisture-content when dry and cool is between two and one-half and five and one-half per cent.

10. In the process of desiccating the solid-content of milk, the steps which consist in delivering a mass of milk onto an evaporating surface *in vacuo* heated in excess of five degrees centigrade above the boiling point of the *vacuo* and in excess of seventy-five degrees centigrade, and sufficiently high to sterilize said milk and then removing said milk in the form of a self-sustaining mass having the identity of a film from said surface while in such a condition that it has a moist appearance and its moisture-content when dry and cool is between two and one-half and four per cent.

11. In the process of desiccating the solid-content of milk *in vacuo* by contact with a moving surface heated in excess of five degrees centigrade above the boiling point of the *vacuo*, the steps which consist in conveying a mass of milk from the source of supply while under pressure of at least atmospheric, through a covered conduit into a receptacle of relatively large superficial content; then maintaining a *vacuo* immediately above the relatively large exposed surface of the milk in said receptacle, while maintaining same out of direct contact with a moving evaporating surface heated in excess of five degrees centigrade above the boiling point of the *vacuo*, whereby expansion of said milk prior to contact with said surface is permitted, and then delivering said milk onto said moving surface while the latter is heated in excess of five degrees centigrade above the boiling point of the milk in said *vacuo*, and then removing said milk in the form of a self-sustaining mass having the identity of a film from said surface in such a condition that its moisture-content when dry and cool is in excess of one and one-half per cent.

12. The process of desiccating the solid-content of milk, which consists in rapidly concentrating a body of milk *in vacuo*, withdrawing a homogeneously concentrated layer therefrom, while effecting a transfer of heat units from the outer surface of said layer to inflowing milk in close proximity thereto and out of contact therewith, delivering the said layer onto a surface heated in excess of five degrees centigrade above the boiling point of the *vacuo*, and removing said milk in the form of a self-sustaining mass having the identity of a film from said surface in such a condition that its moisture-content, when dry and cool is in excess of one and one-half per cent.

13. In the process of desiccating the solid-content of milk, the steps which consist in delivering a mass of milk onto an evaporating surface *in vacuo* heated in sufficient excess of the boiling point of the *vacuo* to effect rapid vaporization of the liquid-content of said mass, and then removing said milk in the form of a self-sustaining mass having the identity of a film from said surface while in such condition that it has a moist appearance, and its moisture content when dry and cool is in excess of one and one-half per cent.

14. In the process of desiccating the solid-content of milk, the steps which consist in delivering a mass of milk onto an evaporating surface *in vacuo* heated in sufficient excess of the boiling point of the *vacuo* to effect rapid vaporization of the liquid-content of said mass, and then removing said milk in the form of a self-sustaining mass having the identity of a film from said surface while in such condition that it has a moist appearance, and its moisture content when dry and cool is between one and one-half and five and one-half per cent.

15. In the process of desiccating the solid-content of milk, the steps which consist in delivering a mass of milk onto an evaporating surface *in vacuo* heated in sufficient excess of the boiling point of the *vacuo* to effect rapid vaporization of the liquid-content of said mass, and then removing said milk in the form of a self-sustaining mass having the identity of a film from said surface while in such condition that it has a moist appearance, and its moisture content when dry and cool is between two and one-half and four per cent.

In testimony whereof I affix my signature in presence of two witnesses.

WAITSTILL H. SWENARTON.

Witnesses:
  EUGENE C. BROWN,
  JULIA B. HILL.